United States Patent
Marinov et al.

(10) Patent No.: US 10,207,345 B2
(45) Date of Patent: Feb. 19, 2019

(54) MITER SAW HAVING AN ANGLED GLIDE HINGE

(71) Applicants: Robert Bosch Tool Corporation, Broadview, IL (US); Robert Bosch GmbH, Stuttgart (DE)

(72) Inventors: Plamen V. Marinov, Mount Prospect, IL (US); Gregory A. Menze, Mount Prospect, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 78 days.

(21) Appl. No.: 15/099,838

(22) Filed: Apr. 15, 2016

(65) Prior Publication Data

US 2016/0303666 A1    Oct. 20, 2016

Related U.S. Application Data

(60) Provisional application No. 62/148,773, filed on Apr. 17, 2015.

(51) Int. Cl.
*B23D 45/04* (2006.01)
*B23D 47/02* (2006.01)
*B27B 5/20* (2006.01)

(52) U.S. Cl.
CPC ......... *B23D 45/048* (2013.01); *B23D 47/025* (2013.01); *B27B 5/208* (2013.01)

(58) Field of Classification Search
CPC ...... B23D 47/00; B23D 45/00; B23D 47/025; B23D 45/04; B23D 45/042; B23D 45/044; B23D 45/046; B23D 45/048
See application file for complete search history.

(56) References Cited

U.S. PATENT DOCUMENTS

| | | | | |
|---|---|---|---|---|
| 1,765,733 A | * | 6/1930 | Olsen | B27B 5/208 144/4.3 |
| 2,664,924 A | | 1/1954 | Tracy | |
| 3,794,283 A | | 2/1974 | Furno | |
| 4,901,608 A | * | 2/1990 | Shieh | B25B 13/461 81/177.8 |
| 5,257,570 A | * | 11/1993 | Shiotani | B23D 45/044 83/471.3 |

(Continued)

OTHER PUBLICATIONS

International Search Report and Written Opinion corresponding to PCT Application No. PCT/US2016/027733, dated Aug. 9, 2016 (17 pages).

*Primary Examiner* — Jason Daniel Prone
*Assistant Examiner* — Richard Crosby, Jr.
(74) *Attorney, Agent, or Firm* — Maginot Moore & Beck LLP (57) ABSTRACT

A motorized saw assembly includes a base assembly having a workpiece support surface which defines a workpiece surface plane, an upper support assembly configured to support a saw blade, and a hinge assembly including a first linkage assembly and a second linkage assembly. The upper support assembly is configured to move between a first position, whereat the first linkage assembly and the second linkage assembly extend substantially perpendicular to the workpiece surface plane, and a second position, whereat the first linkage assembly and the second linkage assembly extend over the workpiece support surface.

10 Claims, 7 Drawing Sheets

(56) References Cited

U.S. PATENT DOCUMENTS

| | | | | |
|---|---|---|---|---|
| 5,365,812 A * | 11/1994 | Harnden | B23D 47/042 | 700/167 |
| 5,743,704 A * | 4/1998 | Caveney | B25J 9/107 | 414/744.5 |
| 5,791,224 A * | 8/1998 | Suzuki | B23D 45/044 | 83/471.3 |
| 6,311,583 B1 * | 11/2001 | Izumisawa | B25B 21/004 | 81/177.8 |
| 6,532,853 B1 * | 3/2003 | Kakimoto | B23D 45/044 | 83/471.3 |
| 6,881,902 B2 * | 4/2005 | Aoki | B60R 16/0215 | 174/135 |
| 6,892,618 B2 * | 5/2005 | Chin-Chin | B23D 47/005 | 16/334 |
| 6,895,839 B1 * | 5/2005 | Hsien | B25G 1/063 | 403/93 |
| 7,059,228 B2 * | 6/2006 | Chang | B23D 45/044 | 83/471.2 |
| 8,104,386 B2 * | 1/2012 | Chen | B27G 19/02 | 83/102.1 |
| 8,322,261 B2 * | 12/2012 | Liu | B27B 5/208 | 83/471.3 |
| 8,499,672 B2 * | 8/2013 | Oberheim | B23D 45/048 | 83/485 |
| 8,631,734 B2 * | 1/2014 | Liu | B23D 45/048 | 83/471.3 |
| 8,752,461 B2 * | 6/2014 | Oberheim | B23D 45/048 | 16/264 |
| 8,857,303 B2 * | 10/2014 | Liu | B23D 45/048 | 83/471.3 |
| 9,079,297 B2 * | 7/2015 | Lance | B25B 13/04 | |
| 2004/0112190 A1 * | 6/2004 | Hollis | B27B 5/29 | 83/13 |
| 2005/0211038 A1 * | 9/2005 | Imamura | B27B 5/29 | 83/473 |
| 2007/0137452 A1 * | 6/2007 | Oberheim | B23D 45/048 | 83/471.3 |
| 2007/0277661 A1 * | 12/2007 | Domeny | B27G 19/02 | 83/477.2 |
| 2009/0158904 A1 * | 6/2009 | Chen | B23D 59/006 | 83/162 |
| 2009/0301277 A1 * | 12/2009 | Ipatenco | B23D 45/048 | 83/471 |
| 2010/0058909 A1 * | 3/2010 | Chen | B23D 45/044 | 83/471.3 |
| 2010/0212467 A1 * | 8/2010 | Oohama | B27B 5/188 | 83/471.2 |
| 2010/0236369 A1 * | 9/2010 | Sudou | B23D 45/042 | 83/471.3 |
| 2010/0300257 A1 * | 12/2010 | Loewe | B23D 59/001 | 83/360 |
| 2011/0303065 A1 | 12/2011 | Liu et al. | | |
| 2012/0017736 A1 * | 1/2012 | Thomas | B23D 45/048 | 83/471.2 |
| 2014/0133900 A1 | 5/2014 | Liu | | |
| 2016/0067801 A1 * | 3/2016 | Cheng | B23D 47/02 | 83/471.3 |
| 2016/0303666 A1 * | 10/2016 | Marinov | B23D 45/048 | 83/471.3 |

* cited by examiner

MITER SAW HAVING AN ANGLED GLIDE HINGE

CROSS-REFERENCE TO RELATED APPLICATION

This application claims priority to U.S. Provisional Application No. 62/148,773, which is entitled "Miter Saw Having an Angled Glide Hinge," and was filed on Apr. 17, 2015, the entire contents of which are hereby incorporated by reference herein.

TECHNICAL FIELD

This disclosure relates generally to miter saws, and more particularly to sliding miter saws.

BACKGROUND

Power miter saws, also known as chop saws or drop saws, are typically used in framing, molding operations, or other machining or carpentry to cut lumber, trim, metal, and other work products. Wide workpieces, such as crown molding and the like, often require a miter saw with either a large saw blade or a configuration that enables the blade to be moved along a horizontal path away from and toward the fence of the miter saw. Such blade moving configurations are generally referred to as sliding compound miter saws.

In order to accomplish the horizontal sliding movement of the saw blade, some conventional miter saws include a sliding guide assembly that has a linear guide, which typically includes two bushing and rod combinations. These relatively expensive linear bearings consist of recirculating ball bearings that operate together with turned, ground, polished, and hardened steel rods that are approximately 40 cm long and 30 mm in diameter. To have minimum play and deflection of the saw blade and motor assembly, precise fits are required between the rods and the linear recirculating ball bearings over the entire linear travel of the rods. Additionally, the rod must be made of steel having high hardness to prevent the hard steel balls from making indentations in the rod. As a result, the sliding guide assemblies are heavy and expensive to manufacture.

An additional undesirable feature of such bushing and rod linear guides is that space must be provided behind the saw for the rods to extend when the saw blade is positioned in its rearmost position, near the fence. Because of this space requirement, a sliding miter saw cannot be positioned such that a wall is immediately behind the base. Consequently, the saw occupies a larger footprint.

Moreover, these bushing and rod linear guide mechanisms are susceptible to damage from dirt and debris. Dirt and debris can penetrate into the ball bushings and damage the bearing. In some saws, the rod and bearings are covered with a bellows or similar cover. However, the dust and debris produced by a saw, particularly in metal cutting saws, typically leads to degradation of the fabric of the bellows and penetration of the ball bushing by the abrasive particles.

Some other conventional miter saws include a hinge assembly having two hinges. One hinge is configured to fold vertically and maintain the lateral position of the saw blade, while the second hinge is configured to fold horizontally and maintain the vertical position of the saw blade. The combination of the two hinges enables forward and rearward movement of the saw blade while restricting vertical and lateral movement.

In some saws, the horizontal hinge is configured to fold outwardly relative to the plane of the saw blade. However, the outward extension of the hinge when in the retracted position, wherein the saw blade is nearest the fence, interferes with the beveling of the saw in the direction of the hinge extension. As a result, a saw having an outwardly extending hinge is typically only able to bevel in one direction, namely the direction opposite the extension of the horizontal hinge.

In other saws, the horizontal hinge is configured to fold inwardly, across the plane of the saw blade. In order to avoid interference between the vertical and horizontal hinges, the hinges must be arranged in line with one another along the sliding direction of the saw blade. For example, the horizontal hinge is typically configured to fold under the vertical hinge. However, since the horizontal hinge is positioned under the vertical hinge, the vertical hinge cannot fully retract. The in-line arrangement of the hinges requires additional space behind the saw blade, and results in more parts in the hinge assembly.

What is needed, therefore, is a miter saw that is more compact, lighter weight, and more portable than conventional miter saws.

SUMMARY

In one embodiment, a motorized saw assembly comprises a base assembly including a workpiece support surface which defines a workpiece surface plane, an upper support assembly configured to support a saw blade, and a hinge assembly including a first linkage assembly and a second linkage assembly. The upper support assembly is configured to move between a first position, whereat the first linkage assembly and the second linkage assembly extend substantially perpendicular to the workpiece surface plane, and a second position, whereat the first linkage assembly and the second linkage assembly extend over the workpiece support surface. In this context, "substantially perpendicular" is defined such that at least 75% of each of the first and second linkage assemblies extend within 10 degrees of perpendicular to the workpiece surface plane.

In another embodiment of the motorized saw assembly, the hinge assembly further comprises a bevel post operably connected to the base assembly and a yoke member operably connected to the upper support assembly. The first linkage assembly comprises a first rear linkage pivotably connected to the bevel post and a first front linkage pivotably connected to the first rear linkage and the yoke member. The second linkage assembly comprises a second rear linkage pivotably connected to the bevel post and a second front linkage pivotably connected to the second rear linkage and the yoke member. In the first position, the first rear linkage and the second rear linkage extend substantially in a first plane that is perpendicular to the workpiece surface plane, and the first front linkage and the second front linkage extend substantially in a second plane that is perpendicular to the workpiece surface plane. In this context, the linkages extending "substantially" in a plane is defined such that at least 75% of the linkages extend within 10 degrees of the corresponding first or second plane.

In a further embodiment, the first front linkage and the first rear linkage pivot in a third plane that is transverse to the workpiece surface plane, and the second front linkage and the second rear linkage pivot in a fourth plane that is transverse to the workpiece surface plane.

In yet another embodiment of the motorized saw assembly, the third plane is arranged at an angle of between approximately 30 degrees and 60 degrees relative to the workpiece surface plane, and the fourth plane is arranged at an angle of between approximately 30 degrees and 60 degrees relative to the workpiece surface plane. In this context, "approximately" is defined to include the recited angle±10 degrees.

In still another embodiment, the third plane and the fourth plane are each arranged at an angle of approximately 45 degrees relative to the workpiece surface plane. In this context, "approximately" is defined to include the recited angle±10 degrees.

In one embodiment of the motorized saw assembly, the first rear linkage includes a first rear linkage body portion and a first rear linkage extension member extending from the first rear linkage body portion at a first angle relative to the first rear linkage body portion, the first angle not equal to 180 degrees. The first front linkage includes a first front linkage body portion and a first front linkage extension member extending from the first front linkage body portion at a second angle relative to the first front linkage body portion, the second angle not equal to 180 degrees. A first hinge pin extends through the first rear linkage extension member and the first front linkage extension member so as to pivotably connect the first front linkage and the first rear linkage to one another.

In a further embodiment of the motorized saw assembly, the second rear linkage includes a second rear linkage body portion and a second rear linkage extension member extending from the second rear linkage body portion at a third angle relative to the second rear linkage body portion, the third angle not equal to 180 degrees. The second front linkage includes a second front linkage body portion and a second front linkage extension member extending from the second front linkage body portion at a fourth angle relative to the second front linkage body portion, the fourth angle not equal to 180 degrees. A second hinge pin extends through the second rear linkage extension member and the second front linkage extension member so as to pivotably connect the second front linkage and the second rear linkage to one another.

In one particular embodiment, the first, second, third, and fourth angles are approximately 30 degrees. In this context, "approximately" is defined to include the recited angle±10 degrees.

In yet another embodiment, the first rear linkage is pivotably connected to the bevel post by a first pin connection, the second rear linkage is pivotably connected to the bevel post by a second pin connection, the first front linkage is pivotably connected to the first rear linkage by a third pin connection, the second front linkage is pivotably connected to the second rear linkage by a fourth pin connection, the first front linkage is pivotably connected to the yoke member by a fifth pin connection, and the second front linkage is pivotably connected to the yoke member by a sixth pin connection.

In some embodiments of the motorized saw assembly, the bevel post is pivotably connected to the base assembly so as to pivot about a pivot axis that extends in the workpiece surface plane.

In one particular embodiment, the bevel post is configured to pivot by at least 45 degrees to each side relative to a vertical plane.

In another embodiment according to the disclosure, a method of operating a motorized saw comprises positioning a workpiece on a workpiece support surface of a base assembly of the motorized saw, the workpiece support surface defining a workpiece support plane, and moving an upper support assembly of the motorized saw, which supports a saw blade, between a first position, whereat a first linkage assembly of a hinge assembly of the motorized saw and a second linkage assembly of the hinge assembly extend substantially perpendicular to the workpiece surface plane, and a second position, whereat the first linkage assembly and the second linkage assembly extend over the workpiece support surface, to cut the workpiece. In this context, "substantially perpendicular" is defined such that at least 75% of each of the first and second linkage assemblies extend within 10 degrees of perpendicular to the workpiece surface plane.

In one embodiment of the method, moving the upper support assembly comprises: moving a first linkage assembly so as to pivot a first rear linkage, which is pivotably connected to a bevel post that is operably connected to the base assembly, relative to a first front linkage pivotably connected to a yoke member, which is operably connected to the upper support assembly; and moving a second linkage assembly so as to pivot a second rear linkage, which is pivotably connected to the bevel post, relative to a second front linkage pivotably connected to the yoke member in such a way that, in the first position, the first rear linkage and the second rear linkage extend substantially in a first plane that is perpendicular to the workpiece surface plane, and the first front linkage and the second front linkage extend substantially in a second plane that is perpendicular to the workpiece surface plane. In this context, the linkages extending "substantially" in a plane is defined such that at least 75% of the linkages extend within 10 degrees of the corresponding first or second plane.

In another embodiment of the method, moving the upper support assembly further comprises pivoting the first front linkage and the first rear linkage relative to one another in a third plane that is transverse to the workpiece surface plane and pivoting the second front linkage and the second rear linkage relative to one another in a fourth plane that is transverse to the workpiece surface plane.

In some embodiments of the method, the third plane is arranged at an angle of between approximately 30 degrees and 60 degrees relative to the workpiece surface plane, and the fourth plane is arranged at an angle of between approximately 30 degrees and 60 degrees relative to the workpiece surface plane. In this context, "approximately" is defined to include the recited angle±10 degrees.

In another embodiment of the method, pivoting the first front linkage and the first rear linkage relative to one another comprises pivoting a first rear linkage body portion relative to a first front linkage body portion about a first pivot pin. A first rear linkage extension member extends from the first rear linkage body portion at a first angle relative to the first rear linkage body portion, the first angle not equal to 180 degrees, and a first front linkage extension member extends from the first front linkage body portion at a second angle relative to the first front linkage body portion, the second angle not equal to 180 degrees. The first pivot pin extends through the first rear linkage extension member and the first front linkage extension member.

In yet another embodiment of the method, pivoting the second front linkage and the second rear linkage relative to one another comprises pivoting a second rear linkage body portion relative to a second front linkage body portion about a second pivot pin. A second rear linkage extension member extends from the second rear linkage body portion at a third angle relative to the second rear linkage body portion, the third angle not equal to 180 degrees, and a second front linkage extension member extends from the second front linkage body portion at a fourth angle relative to the second front linkage body portion, the fourth angle not equal to 180 degrees. The second pivot pin extends through the second rear linkage extension member and the second front linkage extension member.

In one particular embodiment, the first, second, third, and fourth angles are approximately 30 degrees. In this context, "approximately" is defined to include the recited angle±10 degrees.

In another embodiment of the method, moving the first linkage assembly comprises pivoting the first rear linkage is relative to the bevel post at a first pin connection, pivoting the first front linkage relative to the first rear linkage at a second pin connection, and pivoting the first front linkage relative to the yoke member at a third pin connection. Moving the second linkage assembly comprises pivoting the second rear linkage relative to the bevel post at a fourth pin connection, pivoting the second front linkage relative to the second rear linkage at a fifth pin connection, and pivoting the second front linkage relative to the yoke member at a sixth pin connection.

In one embodiment of the method, the bevel post is pivotable about a pivot axis, which extends in the workpiece surface plane, relative to the base assembly by at least 45 degrees to each side relative to a vertical plane.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

Figure 1:
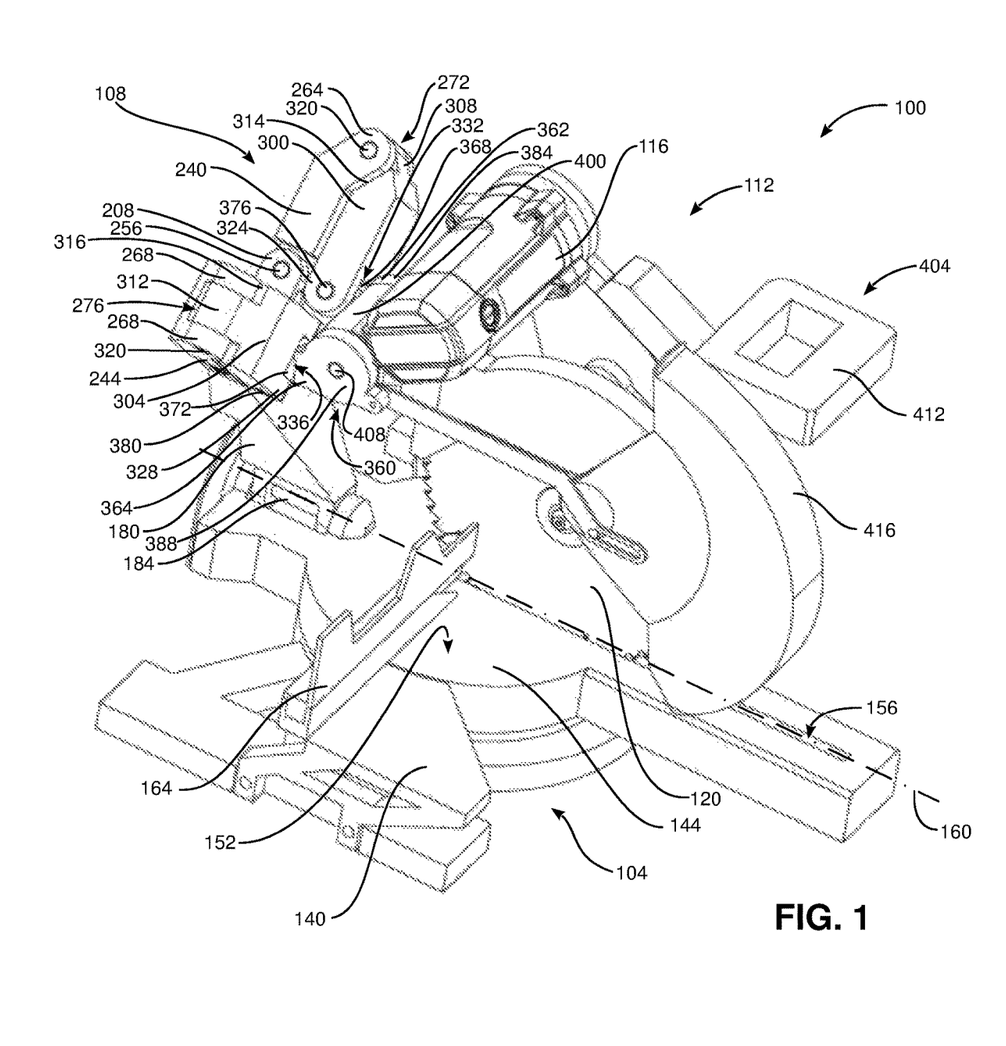
FIG. 1 is a side perspective view of a miter saw having an angled hinge assembly in a retracted position.
Figure 2:
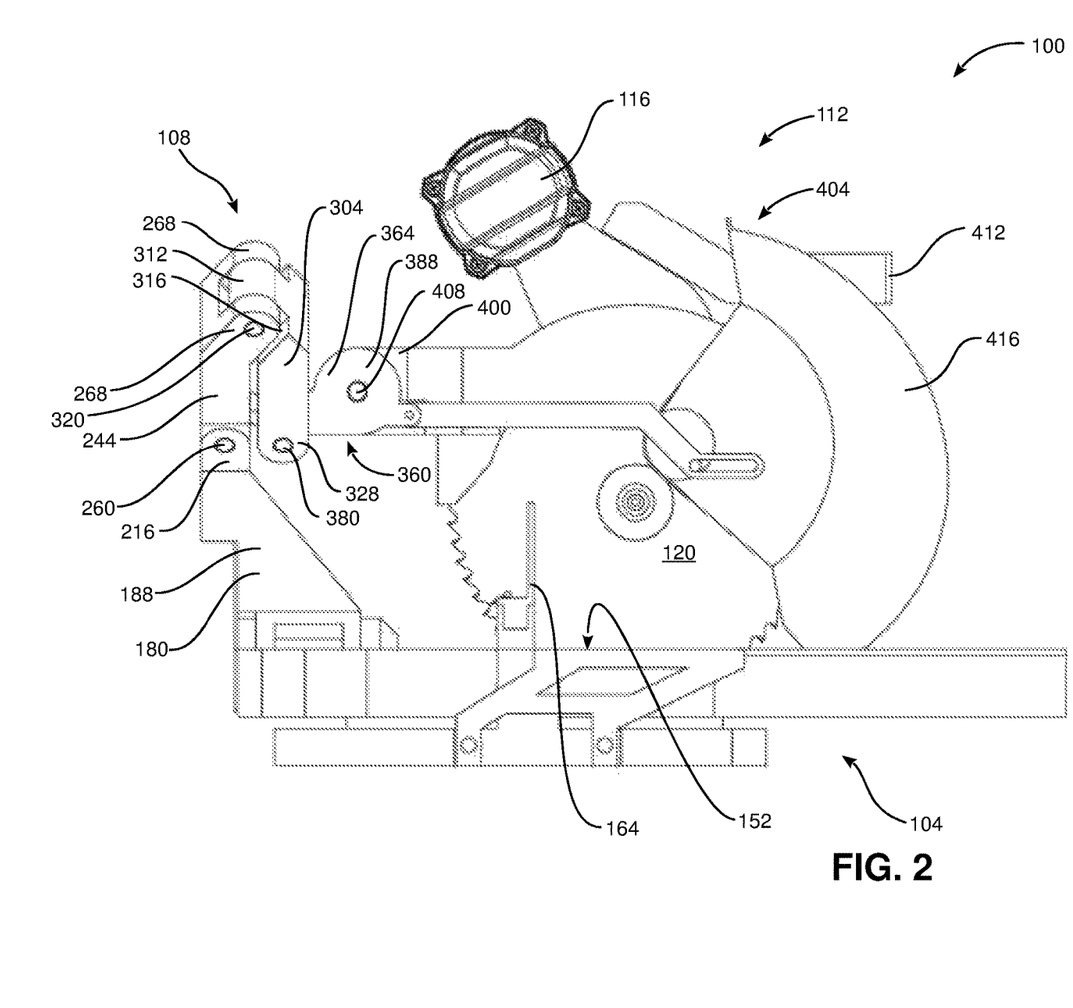
FIG. 2 is a side elevational view of the miter saw of FIG. 1 with the angled hinge assembly in the retracted position.
Figure 3:
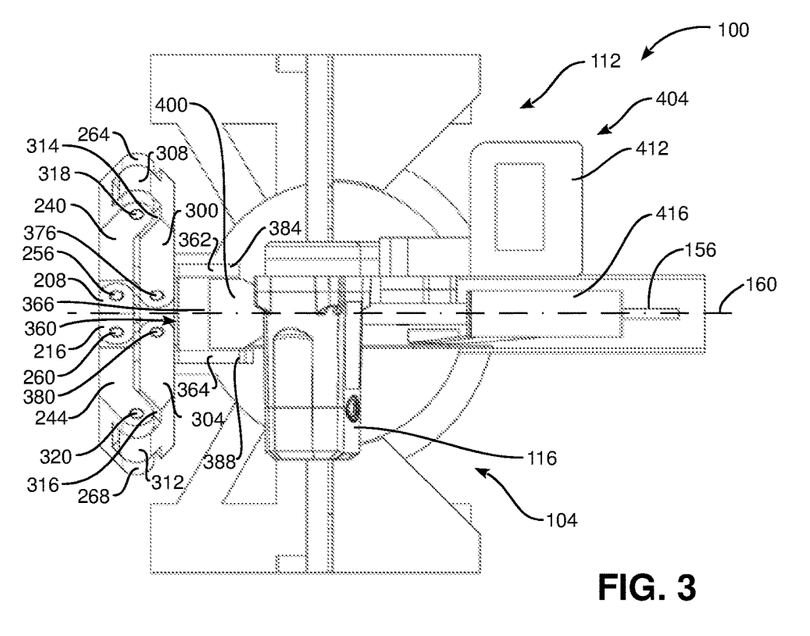
FIG. 3 is a top view of the miter saw of FIG. 1 with the angled hinge assembly in the retracted position.

FIGS. 1-3 illustrate a miter saw 100 according to the disclosure. The miter saw 100 includes a base assembly 104, a hinge assembly 108, an upper support assembly 112, a motor 116, and a saw blade 120.

As seen in FIG. 1, the base assembly 104 includes a fixed portion 140 and a rotatable portion 144. The fixed portion 140 of the base assembly 104 is configured to be supported by a table or other support structure (not shown), while the rotatable portion 144 is rotatably supported by the fixed portion 140 in such a way that the rotatable portion 144 is rotatable about a miter axis extending vertically through the center of the rotatable portion 144 at a fence 164 in order to perform a miter cut.

The fixed portion 140 and the rotatable portion 144 jointly form a work surface 152, on which a workpiece (not shown) is supported during cutting. A slot 156 is defined in the rotatable portion 144 along a bevel axis 160 such that the saw blade 120 extends partially through the slot 156 into the rotatable portion 144. The fence 164 is attached to the fixed portion 140 of the base assembly 104 and is positioned orthogonally with respect to the work surface 152. The fence 164 is configured to provide a rear support surface against which the workpiece is supported during cutting.

Figure 4:
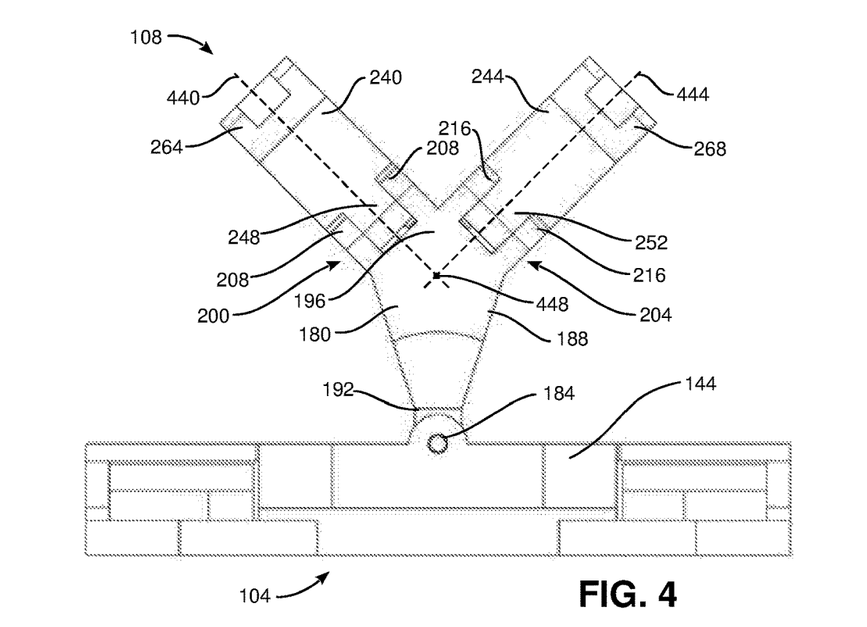
FIG. 4 is a rear elevational view of the angled hinge assembly of the miter saw of FIG. 1 in the retracted position.
Figure 5:
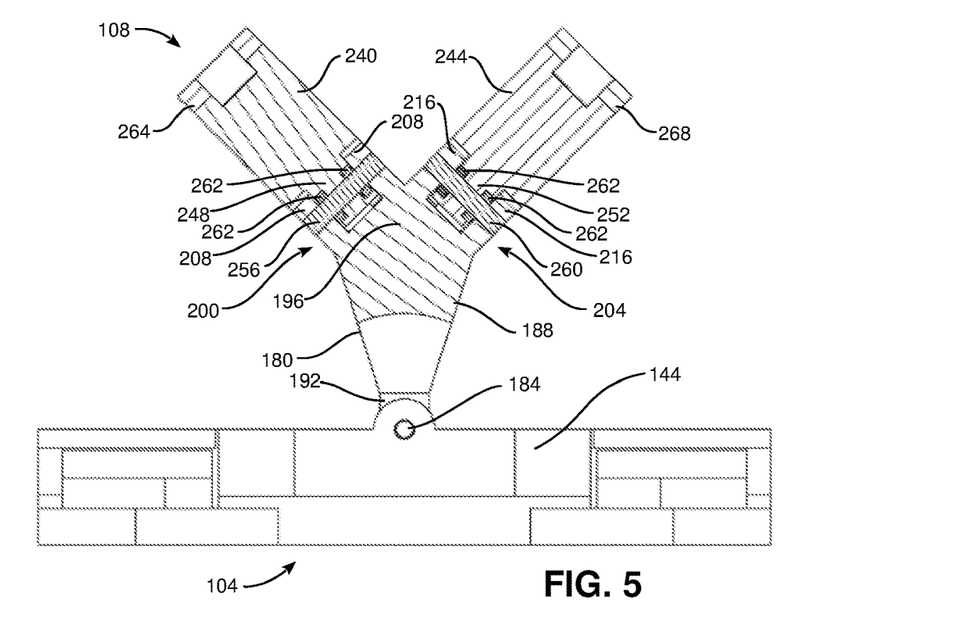
FIG. 5 is a rear cross-sectional view of the angled hinge assembly of the miter saw of FIG. 1 in the retracted position.

With continuing reference to FIGS. 1-3 and further reference to FIGS. 4 and 5, the hinge assembly 108 is connected to the rotatable portion 144 of the base assembly 104 and is configured to support the upper support assembly 112, the motor 116, and the saw blade 120. The hinge assembly 108 includes a bevel post 180 connected to the rotatable portion 144 of the base assembly 104 by a bevel shaft 184. The bevel post 180 is configured to pivot about the bevel axis 160 and bevel shaft 184 to set the bevel angle of upper support assembly 112 and the saw blade 120.

Figure 6:
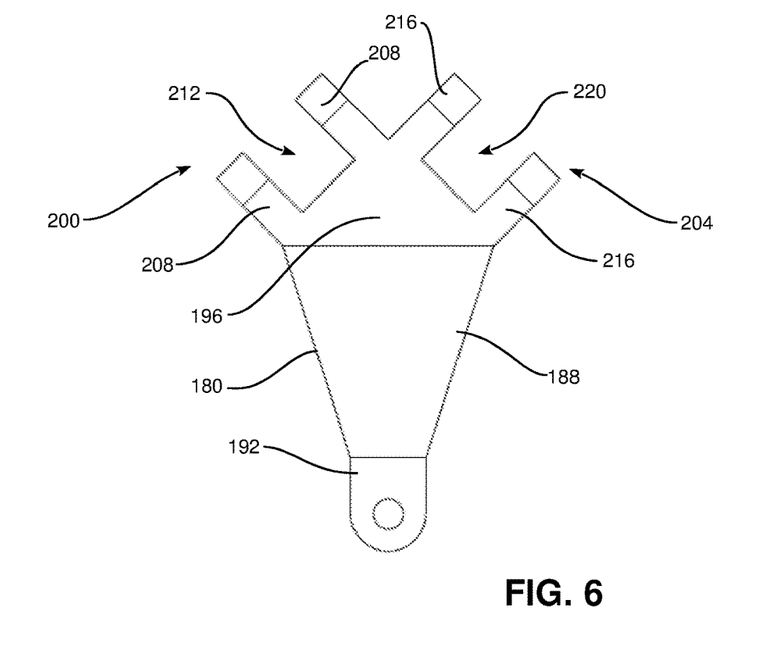
FIG. 6 is a rear elevational view of the bevel post of the hinge assembly of the miter saw of FIG. 1.
Figure 7:
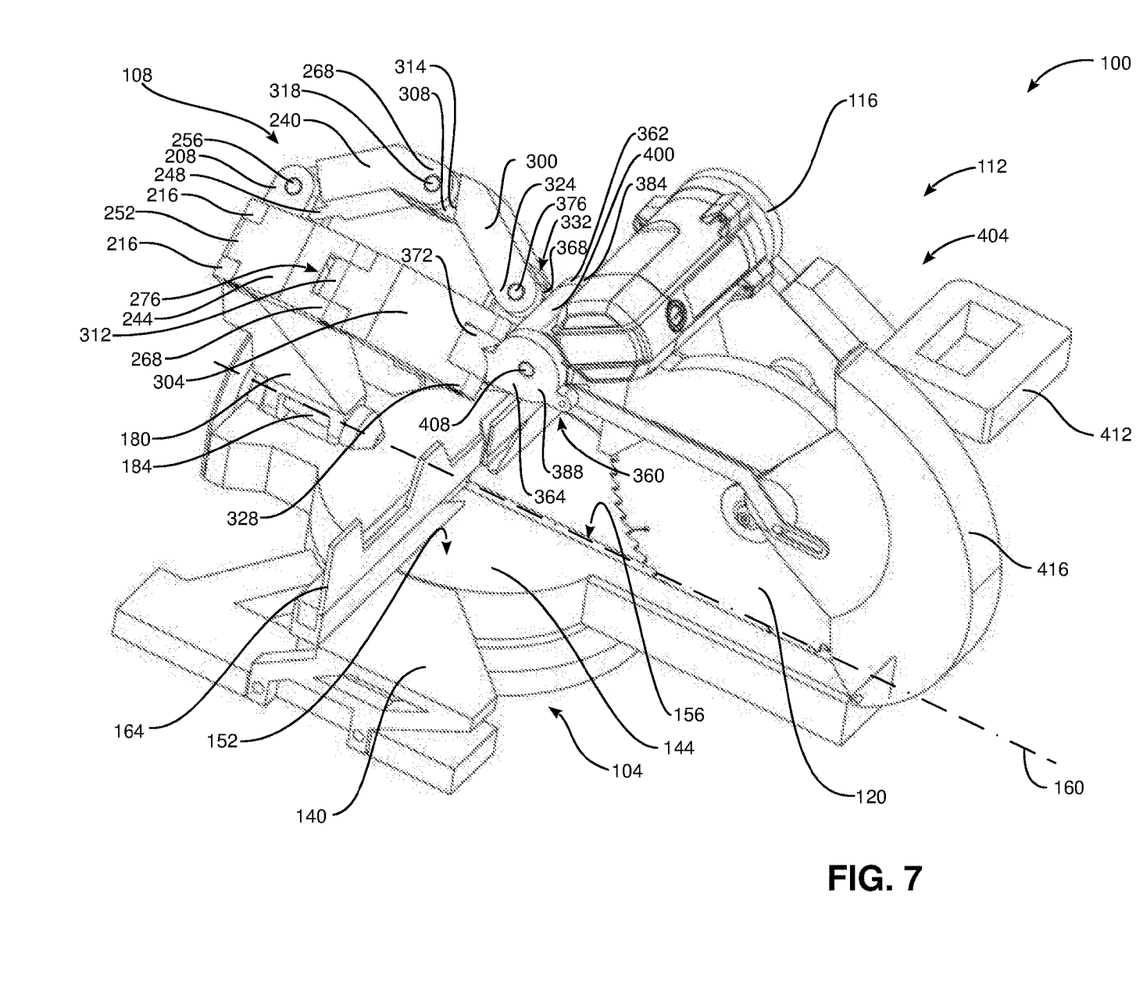
FIG. 7 is a side perspective view of the miter saw of FIG. 1 with the angled hinge assembly in an extended position.
Figure 8:
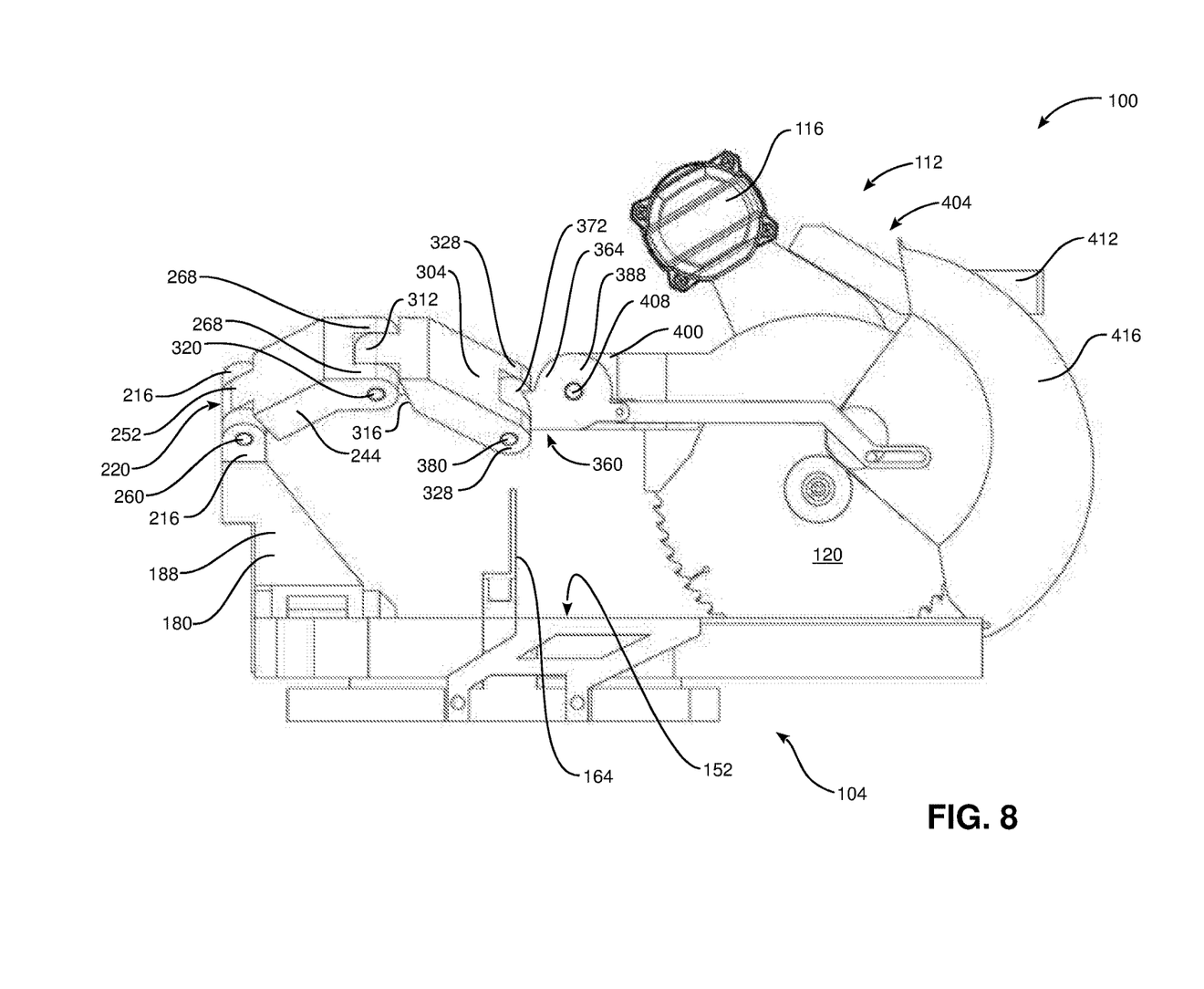
FIG. 8 is a side elevational view of the miter saw of FIG. 1 with the angled hinge assembly in the extended position.

With particular reference to FIGS. 5 and 6, the bevel post 180 includes a body 188, which increases in width from a first end 192, at which the bevel shaft 184 is located, to a second end 196. The second end 196 of the bevel post 180 includes a first hinge connection 200 and a second hinge connection 204. The first hinge connection 200 includes two extension members, or flanges 208, extending to the left (as seen in the rear view of FIGS. 5 and 6) at an angle of approximately 45 degrees with respect to vertical, and the two flanges 208 define an opening 212 therebetween. Likewise, the second hinge connection 204 includes two extension members, or flanges 216, extending to the right at an angle of approximately 45 degrees with respect to vertical, and the two flanges 216 define an opening 220 therebetween. In another embodiment, the flanges 208, 216 of the first and second hinge connections 200, 204, respectively, are angled at another desired angle, for example an angle of between approximately 30 degrees and 60 degrees with respect to vertical.

With reference to FIGS. 1, 3, and 4, and with particular reference to FIG. 5, a first rear hinge linkage 240 is connected to the first hinge connection 200 of the bevel post 180, while a second rear hinge linkage 244 is connected to the second hinge connection 204. The first and second hinge linkages 240, 244 each include an extension member, in the form of a projection 248, 252, respectively, extending into the opening 212, 220 of the respective hinge connection 200, 204. A pin 256, 260 pivotably connects each projection 248, 252 to the respective flanges 208, 216 of the associated hinge connection 200, 204. Two bearings 262 are positioned between the flanges 208, 216 and the respective pin 256, 260 such that the pins 256, 260 rotate freely with respect to the projections 248, 252 of the rear hinge linkages 240, 244. As a result, the rear hinge linkages 240, 244 are pivotable relative to the bevel post 180 about the respective pin 256, 260.

Referring now to FIGS. 1-3 and 7-9, at an end opposite the projections 248, 252, the first hinge linkages 240, 244 each include a pair of extension members, or flanges 264, 268, respectively, extending away from the body of the first hinge linkages 240, 244. In the illustrated embodiment, the flanges 264, 268 are oriented at an angle of approximately 30 degrees relative to the body, though in other embodiments the flanges 264, 268 are oriented at another suitable angle relative to the body, for example approximately 45 degrees, approximately 60 degrees, or approximately 90 degrees. Each pair of flanges 264, 268 defines an opening 272, 276, respectively, therebetween.

A first forward hinge linkage 300 and a second forward hinge linkage 304 are connected to the first rear hinge linkage 240 and the second rear hinge linkage 244, respectively. The forward hinge linkages 300, 304 each include an extension member in the form of a projection 308, 312, respectively, extending away from the body of the respective forward hinge linkage 300, 304 at an angle. In one embodiment, the angle is approximately 30 degrees, though the projection is angled at another desired angle in other embodiments, for example approximately 45 degrees, approximately 60 degrees, or approximately 90 degrees. In the illustrated embodiment, the angle of the projections 308, 312 relative to the body of the forward hinge linkages 300, 304 is substantially equal to the angle between the flanges 264, 268 and the body of the rear hinge linkages 240, 244. The body of each of the forward hinge linkages 300, 304 includes a bevel 314, 316 at the extension of the projections 308, 312 oriented generally the same angle as the flanges 264, 268 of the respective rear hinge linkage 240, 244 in the retracted position. Each of the projections 308, 312 is connected to the respective pair of flanges 264, 268 by a pin 318, 320 and two bearings (not shown) similar to the bearings 262 described above to enable the pin 318, 320 to rotate relative to the projection of the forward hinge linkage 300, 304, respectively. As a result, the rear hinge linkages 240, 244 and the forward hinge linkages 300, 304 are pivotable relative to one another about the pins 318, 320.

At an opposite end of the forward hinge linkages 300, 304 from the projections 308, 312, the forward hinge linkages 300, 304 each include a pair of extension members or flanges 324, 328, respectively, that define an opening 332, 336 therebetween. In the illustrated embodiment, each pair of flanges 324, 328 extends along the body of the respective forward linkage 300, 304.

Figure 9:
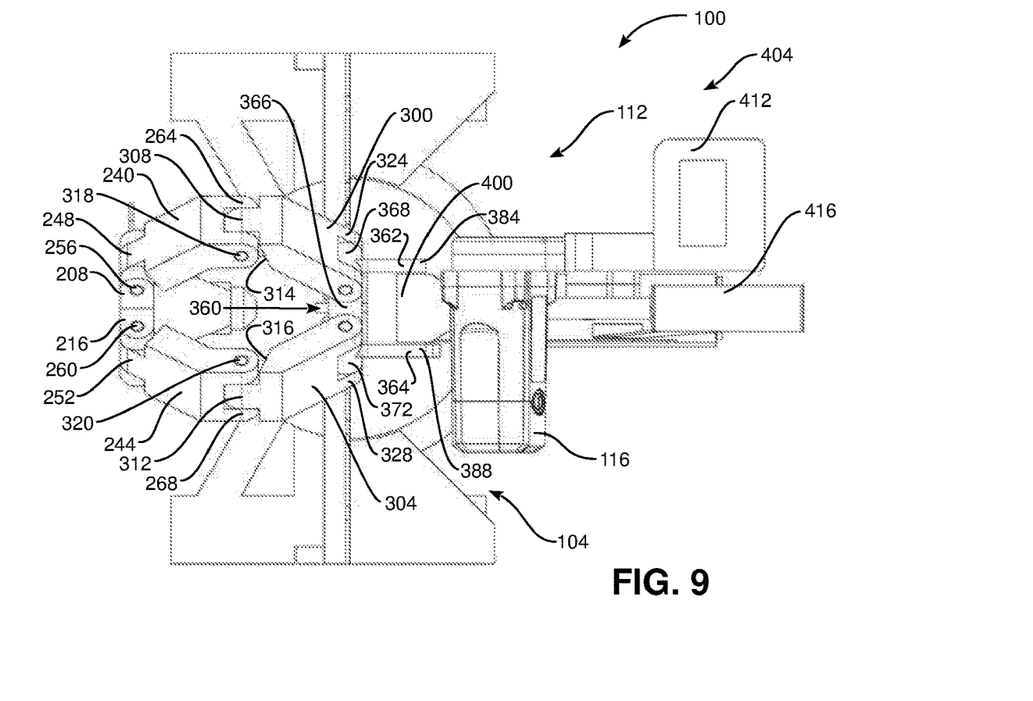
FIG. 9 is a top view of the miter saw of FIG. 1 with the angled hinge assembly in the extended position.

With particular reference to FIGS. 3 and 9 and continuing reference to FIGS. 1, 2, 7, and 8 the hinge assembly 108 further includes a yoke 360 connected to the forward hinge linkages 300, 304. The yoke 360 includes a first side 362, a second side 364, and a central region 366 connecting the first and second sides 362, 364. The first and second sides 362, 364 of the yoke 360 each include a rear end region 368, 372, respectively, that extends into the opening 332, 336 of the associated forward hinge linkage 300, 304. A pin 376, 380 and a pair of bearings (not shown) similar to the bearings 262 described above connect each of the rear end regions 368, 372 of the yoke 360 to the flanges 324, 328 of the respective forward hinge linkage 300, 304. As a result, the forward hinge linkages 300, 304 are each pivotable relative to the yoke 360 about the respective pin 376, 380. The yoke 360 further includes two forward end regions 384, 388 connected to the rear end regions 368, 372, respectively, to connect the hinge assembly 108 to the upper support assembly 112.

The upper support assembly 112 includes a rear end region 400 and a front end region 404. The rear end region 400 of the support assembly 112 is connected to the forward end regions 384, 388 of the yoke 360 via a pin 408 (FIGS. 1 and 2) and bearings (not shown) in such a way that the upper support assembly 112 is pivotable relative to the hinge assembly 108 about the pin 408. The front end region 404 of the upper support assembly 112 supports the motor 116 and the saw blade 120, and includes a handle 412 and a lower guard assembly 416. The handle 412 is configured to enable a user to manipulate the upper support assembly 112 to position the saw blade 120 and to cut a workpiece. The lower guard 416 partially surrounds the saw blade 120 to reduce the likelihood of accidental contact with the saw blade 120.

As can be seen particularly in the view of FIGS. 1-3 and 7-9, the hinge linkages 240, 244, 300, 304 are configured such that, in the retracted position, the body of each of the first rear hinge linkage 240 and the second rear hinge linkage 244 is substantially parallel to the body of the first forward hinge linkage 300 and the body of the second forward hinge linkage 304, respectively, with minimal space between the forward hinge linkages 240, 244 and the respective rear hinge linkages 300, 304. This configuration enables the hinge assembly 108 to be compact, thereby reducing the overall footprint of the saw 100. Moreover, the compact hinge arrangement requires a lesser quantity of material and the overall weight of the hinge assembly 108 is reduced. As a result, the miter saw 100 according to the disclosure is more portable compared to conventional miter saws.

Figure 10:
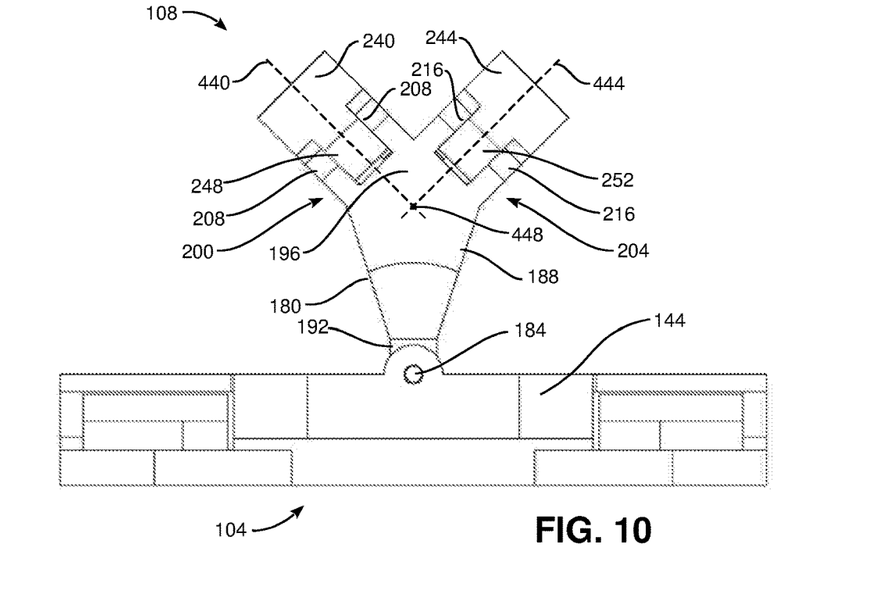
FIG. 10 is a rear elevational view of the angled hinge assembly of the miter saw of FIG. 1 in the extended position.

The connection pins 256, 318, 376 are all arranged generally normal to plane 440 (FIGS. 4 and 10), which is at an angle of approximately 45 degrees relative to the plane of the saw blade 120. Likewise, the connection pins 260, 320, 380 are all arranged generally normal to plane 444, which is at an angle of approximately 45 degrees relative to the plane of the saw blade 120 in the opposite direction as plane 440. As such, the first linkages 240, 300 can only pivot in plane 440, while the second linkages 244, 304 can only pivot in plane 444. As a result, the hinge assembly 108 permits movement of the upper support assembly 112 and the saw blade 120 only along a linear path along the line of intersection 448 of the planes 440, 444. Consequently, the hinge assembly 108 enables linear movement of the upper support assembly 112, while disabling all other movement of the upper support assembly 112.

In use, the user sets the miter angle by rotating the rotating portion 144 of the base assembly 104 relative to the fixed portion 140 and the fence 164. If desired, the user may also set the bevel angle of the saw 100 by pivoting the bevel post 180 and upper support assembly 112 about the bevel shaft 184. The user then positions the miter saw 100 in the extended position shown in FIGS. 7-10 and raises the handle 412, pivoting the upper support assembly 112 and saw blade 120 about the pin 408 in an upwardly direction to a raised position (not shown). The saw blade 120 moves out of and away from the slot 156, thereby allowing a workpiece to be positioned on the work surface 152 against the fence 164. The upper support assembly 112 is then lowered back into the slot 156 in the lowered extended position of FIGS. 7-10.

The user activates the motor 116 by, for example, pressing a trigger (not shown) on the handle 412. The motor 116 spins the saw blade 120 via a power transmission system (not shown) operably connecting the motor 116 and the saw blade 120. The user then presses the handle 412 in a direction toward the rear of the saw 100, which moves the upper support assembly 112 toward the rear of the saw.

The rearward movement of the upper support assembly 112 moves the yoke 360 rearwardly, which also causes the pins 376, 380 and the forward hinge linkages 300, 304 to move rearwardly. Since the flanges 208, 216 of the bevel post 180 are fixed against movement, the rearward movement of the forward linkages 300, 304 forces the ends of the forward and rear linkages 240, 300 and, 244, 304 at the pins 318, 320 to move upwardly and outwardly relative to the plane of the saw blade 120, pivoting the rear hinge linkages 240, 244 about the pins 256, 260. The first hinge linkages 240, 300 fold together along the first plane 440 and the second hinge linkages 244, 304 fold together along the second plane 444.

As discussed above, the hinge linkages 240, 300, 244, 304 enable only one degree of freedom in which the upper support assembly 112 can move. As a result, the movement of the connections between the forward and rear linkages 240, 300 and 244, 304 guides the yoke 360 along a linear path toward the rear of the saw 100. The yoke 360 guides the upper support assembly 112 along this same linear path via the connection at the pin 408, thereby moving the saw blade 120 along the linear path to cut through the workpiece.

After the saw blade 120 passes through the workpiece to the rear end of the saw 100, the hinge assembly 108 is in the fully retracted position shown in FIGS. 1-4. As illustrated particularly in FIGS. 1-3, the rear hinge linkages 240, 244 extend in substantially the same vertically oriented plane. Moreover, the forward hinge linkages 300, 304 extend in a second plane that is essentially parallel to the vertical plane of the rear hinge linkages 240, 244. The rear and forward hinge linkages 240, 244, 300, 304 are spaced apart from one another by a minimal distance. As a result, the hinge assembly 108 is very compact in the longitudinal direction of the saw 100. In addition, the distance by which the hinge assembly 108 extends beyond the base assembly 104 in the rear of the saw 100 is reduced, thereby enabling the miter saw 100 to be positioned against a wall or other surface.

Additionally, as can be seen particularly in FIG. 4, the lateral distance by which the hinge assembly 108 projects away from the vertical plane of the saw blade 120 is relatively small in both the retracted position and the extended position. As a result, the miter saw 100 can be beveled about the bevel shaft 184 in either direction without the hinge assembly 108 contacting the base assembly 104. In one embodiment, the miter saw 100 is configured to bevel in each direction by an angle of at least 45 degrees relative to the vertical plane.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the foregoing disclosure.

The invention claimed is:

1. A motorized saw assembly comprising:
a base assembly including a workpiece support surface which defines a workpiece surface plane;
an upper support assembly configured to support a saw blade;
a hinge assembly including a first linkage assembly and a second linkage assembly, the first linkage assembly including a first rear linkage having a first rear linkage body portion and a first front linkage having a first front linkage body portion, the first front linkage pivotably connected to the first rear linkage, and the second linkage assembly including a second rear linkage having a second rear linkage body portion and a second front linkage having a second front linkage body portion, the second front linkage pivotably connected to the second rear linkage,
wherein the upper support assembly is configured to move between a first position, whereat the first linkage assembly and the second linkage assembly extend substantially perpendicular to the workpiece surface plane, and a second position, whereat the first linkage assembly and the second linkage assembly extend over the workpiece support surface,
wherein, in the first position, the first rear linkage body portion and the second rear linkage body portion extend in a first plane that is perpendicular to the workpiece surface plane, and the first front linkage body portion and the second front linkage body portion extend in a second plane that is perpendicular to the workpiece surface plane,
wherein the first front linkage and the first rear linkage pivot in a third plane that is transverse to the workpiece surface plane, the first front linkage having a first longitudinal axis extending centrally from a first end of the first front linkage to a second opposite end of the first front linkage at which the first front linkage connects to the first rear linkage, the first rear linkage having a second longitudinal axis extending centrally from a first end of the first rear linkage, at which the first rear linkage connects to the first front linkage, to a second opposite end of the first rear linkage, and both the first and second longitudinal axes are entirely in the third plane, and
wherein the second front linkage and the second rear linkage pivot in a fourth plane that is transverse to the workpiece surface plane, the second front linkage having a third longitudinal axis extending centrally from a first end of the second front linkage to a second opposite end of the second front linkage at which the second front linkage connects to the second rear linkage, the second rear linkage having a fourth longitudinal axis extending centrally from a first end of the second rear linkage, at which the second rear linkage connects to the second front linkage, to a second opposite end of the second rear linkage, and both the third and fourth longitudinal axes are entirely in the fourth plane.

2. The motorized saw assembly of claim 1, wherein:
the hinge assembly further comprises:
a bevel post operably connected to the base assembly; and
a yoke member operably connected to the upper support assembly;
the second end of the first rear linkage is pivotably connected to the bevel post;
the first end of the first front linkage is pivotably connected to the yoke member;
the second end of the second rear linkage is pivotably connected to the bevel post; and
the first end of the second front linkage is pivotably connected to the yoke member.

3. The motorized saw assembly of claim 2, wherein:
the first rear linkage is pivotably connected to the bevel post by a first pin connection;
the second rear linkage is pivotably connected to the bevel post by a second pin connection;
the first front linkage is pivotably connected to the first rear linkage by a third pin connection;
the second front linkage is pivotably connected to the second rear linkage by a fourth pin connection;
the first front linkage is pivotably connected to the yoke member by a fifth pin connection; and
the second front linkage is pivotably connected to the yoke member by a sixth pin connection.

4. The motorized saw assembly of claim 2, wherein the bevel post is pivotably connected to the base assembly so as to pivot about a pivot axis that extends in the workpiece surface plane.

5. The motorized saw assembly of claim 4, wherein the bevel post is configured to pivot by at least 45 degrees to each side relative to a vertical plane.

6. The motorized saw assembly of claim 1, wherein the third plane is arranged at an angle of between approximately 30 degrees and 60 degrees relative to the workpiece surface plane, and the fourth plane is arranged at an angle of between approximately 30 degrees and 60 degrees relative to the workpiece surface plane.

7. The motorized saw assembly of claim 6, wherein the third plane and the fourth plane are each arranged at an angle of approximately 45 degrees relative to the workpiece surface plane.

8. The motorized saw assembly of claim 1, wherein:
the first rear linkage includes a first rear linkage extension member extending from the first rear linkage body portion at a first angle relative to the first rear linkage body portion, the first angle not equal to 180 degrees;
the first front linkage includes a first front linkage extension member extending from the first front linkage body portion at a second angle relative to the first front linkage body portion, the second angle not equal to 180 degrees; and
a first hinge pin extends through the first rear linkage extension member and the first front linkage extension member so as to pivotably connect the first front linkage and the first rear linkage to one another.

9. The motorized saw assembly of claim 8, wherein:
the second rear linkage includes a second rear linkage extension member extending from the second rear linkage body portion at a third angle relative to the second rear linkage body portion, the third angle not equal to 180 degrees;
the second front linkage includes a second front linkage extension member extending from the second front linkage body portion at a fourth angle relative to the second front linkage body portion, the fourth angle not equal to 180 degrees; and
a second hinge pin extends through the second rear linkage extension member and the second front linkage extension member so as to pivotably connect the second front linkage and the second rear linkage to one another.

10. The motorized saw assembly of claim 9, wherein the first, second, third, and fourth angles are approximately 30 degrees.

* * * * *